(12) United States Patent
Eisenhut et al.

(10) Patent No.: US 6,370,807 B1
(45) Date of Patent: Apr. 16, 2002

(54) COMBINED FIREARM GUNSTOCK AND GAME CALL DEVICE

(76) Inventors: Anthony R. Eisenhut, 15 Dandyview Heights, Lansing, NY (US) 14882; William B. Weston, 2039 Noble Rd., Clyde, NY (US) 14433

( * ) Notice: Subject to any disclaimer, the term of this patent is extended or adjusted under 35 U.S.C. 154(b) by 0 days.

(21) Appl. No.: 09/383,928

(22) Filed: Aug. 26, 1999

(51) Int. Cl.[7] ............................................. F41C 27/00
(52) U.S. Cl. ........................... 42/90; 446/397; 446/418
(58) Field of Search .............................. 42/90; 446/397, 446/418, 419, 420, 421, 422

(56) References Cited

U.S. PATENT DOCUMENTS

| | | | |
|---|---|---|---|
| 3,439,572 A | * 4/1969 | Cohen | |
| 3,742,493 A | * 6/1973 | Berne | ........................ 340/388 |
| D296,880 S | 7/1988 | Morrocco | |
| 5,020,630 A | * 6/1991 | Gunness | .................... 181/192 |
| 5,035,390 A | 7/1991 | Sanders | |
| 5,244,430 A | 9/1993 | Legursky | |
| 5,342,146 A | 8/1994 | Cooper | |
| 5,419,304 A | 5/1995 | Pardue | |
| 5,431,590 A | 7/1995 | Abbas | |
| 5,529,526 A | * 6/1996 | Wesley | ........................ 446/397 |
| 5,562,521 A | * 10/1996 | Butler et al. | ................. 446/397 |
| D377,383 S | 1/1997 | Morocco | |
| 5,615,508 A | 4/1997 | Miller et al. | |
| 5,664,360 A | 9/1997 | Conway | |
| 5,704,154 A | 1/1998 | Galfidi, Jr. | |
| 6,010,389 A | 1/2000 | Terll | .......................... 446/404 |
| 6,059,069 A | * 5/2000 | Hughes, II | .................. 181/152 |

* cited by examiner

Primary Examiner—Stephen M. Johnson
(74) Attorney, Agent, or Firm—Nixon & Vanderhye P.C.

(57) ABSTRACT

Game call devices include a sound propagation horn to assist in the propagation of the simulated sound of the game's call. The game call device and sound propagation horn are most preferably attached to a portion of a firearm stock. In particularly preferred forms, turkey call devices of the type having a strike face include a generally triangularly shaped sound channel or sound propagation horn radially extending therefrom. The turkey call device and its horn are most preferably formed as an integral or unitary part of the firearm stock. Alternatively, a flexible elastic band may encircle the stock in stretch-fit relationship thereto, with the turkey call device and its associated horn being attached to a surface of the elastic band, for example, with hook-and-pile fabric fasteners (e.g., VELCRO-brand fabric fasteners).

8 Claims, 4 Drawing Sheets

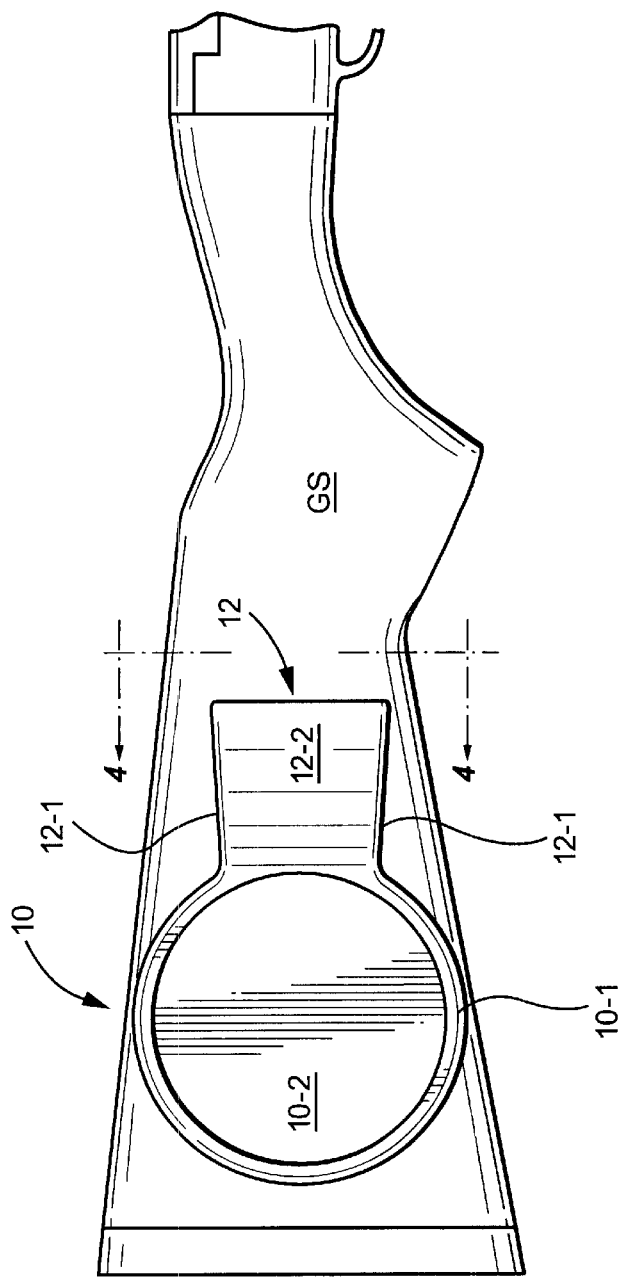
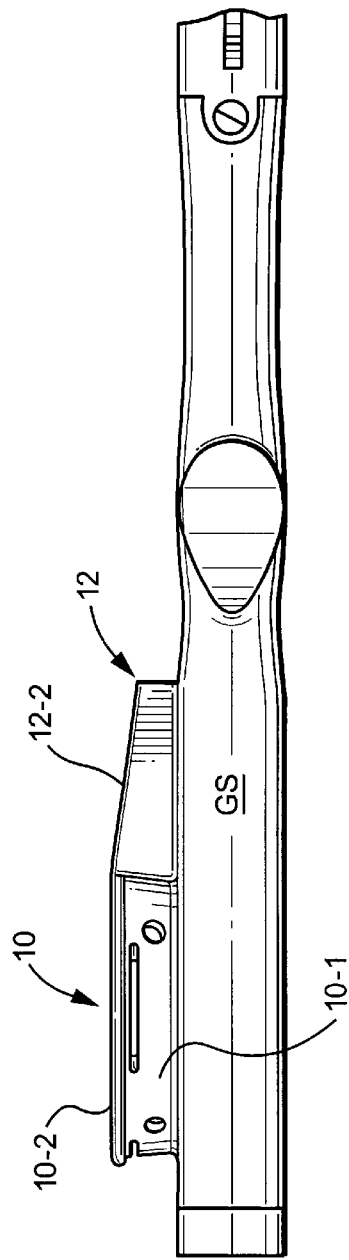

COMBINED FIREARM GUNSTOCK AND GAME CALL DEVICE

FIELD OF THE INVENTION

The present invention relates generally to game call devices, and more particularly, to game call devices that are attached to hunting firearms.

BACKGROUND OF THE INVENTION

Hunters will sometimes use devices to simulate the call of the particular game being hunted. These game call devices usually necessitate that one, or sometimes both, of the hunter's hands be used to operate the game call. The hunter will thus not be in the most desirable position to aim and fire his/her firearm at the hunted game, if sighted, when operating the game call. As a result, the art has proposed numerous devices to attach game call devices to hunting firearms and/or archery bows as shown, for example, in U.S. Pat. Nos. 5,664,360; 5,704,154; 5,035,390; 5,419,304; 5,431,590; and 5,244,430. While such prior proposals are satisfactory for their intended purpose, there is still need for improvement, and it is toward providing such improvement that the present invention is directed.

SUMMARY OF THE INVENTION

Broadly, the present invention is embodied in a game call device which includes a sound propagation horn to assist in the propagation of the simulated sound of the game's call. Most preferably, the game call device is attached to a portion of a firearm stock. In particularly preferred forms, the present invention is embodied in a turkey call device of the type having a strike face and a generally triangularly shaped sound channel or horn radially extending therefrom. The turkey call device and its horn are most preferably formed as an integral or unitary part of the firearm stock. Alternatively, a flexible elastic band may encircle the stock in stretch-fit relationship thereto, with the turkey call device and its associated horn being attached to a surface of the elastic band, for example, with hook-and-pile fabric fasteners (e.g., VELCRO-brand fabric fasteners).

These, as well as other, aspects and advantages of the present invention will become more clear after careful consideration is given to the following detailed description of the following preferred exemplary embodiments thereof.

BRIEF DESCRIPTION OF THE ACCOMPANYING DRAWINGS

Reference will hereinafter be made to the following detailed description of the following FIG. 1 is a perspective view showing a gunstock of a shoulder mounted firearm with an integral game call device in accordance with one embodiment of the present invention;

FIG. 2 is a side elevational view of the gunstock depicted in FIG. 1;

FIG. 3 is a bottom view of the gunstock depicted in FIG. 1;

DETAILED DESCRIPTION OF THE INVENTION

Accompanying FIGS. 1–4 depict one embodiment of the present invention whereby a game call device 10 is provided as an integral (preferably unitary) part of a gunstock GS of a shoulder mounted firearm (e.g., rifle or shotgun). In this regard, the game call device 10 is depicted as being in the form of a turkey call having a truncated conical sidewall section 10-1 and an upper circular strike face 10-2. As is well known, a suitable striker (not shown) is struck against the strike face 10-2 in order to produce a sound simulating the call of wild turkeys. In accordance with the present invention, the turkey call 10 is provided with a generally triangularly shaped sound channel or sound propagation horn 12 which radially extends outwardly from the sidewall 10-1.

The sound propagation horn 12 is formed by an opposed pair of sidewalls 12-1 which diverge relative to one another in a direction away from the turkey call 10. A top wall 12-2 joins the pair of side walls 12-1 one to another and most preferably converges toward the gun stock in a direction away from the turkey call 10 (see FIG. 3). The surface of the gunstock GS subjacent to, and opposite of, the top wall 12-2 serves to define, together with the sidewalls 12-1 a tubular, generally triangular channel to assist in the propagation of the game call sound when the game call device 10 is activated. Moreover, the horn 12 extends generally parallel to the surface of the gunstock. The horn 12 is acoustically coupled to the interior of the game call device 10 by a sound aperture 10-4 formed in the side wall region 10-1 thereof at the proximal end of the horn 12.

Figure 1:
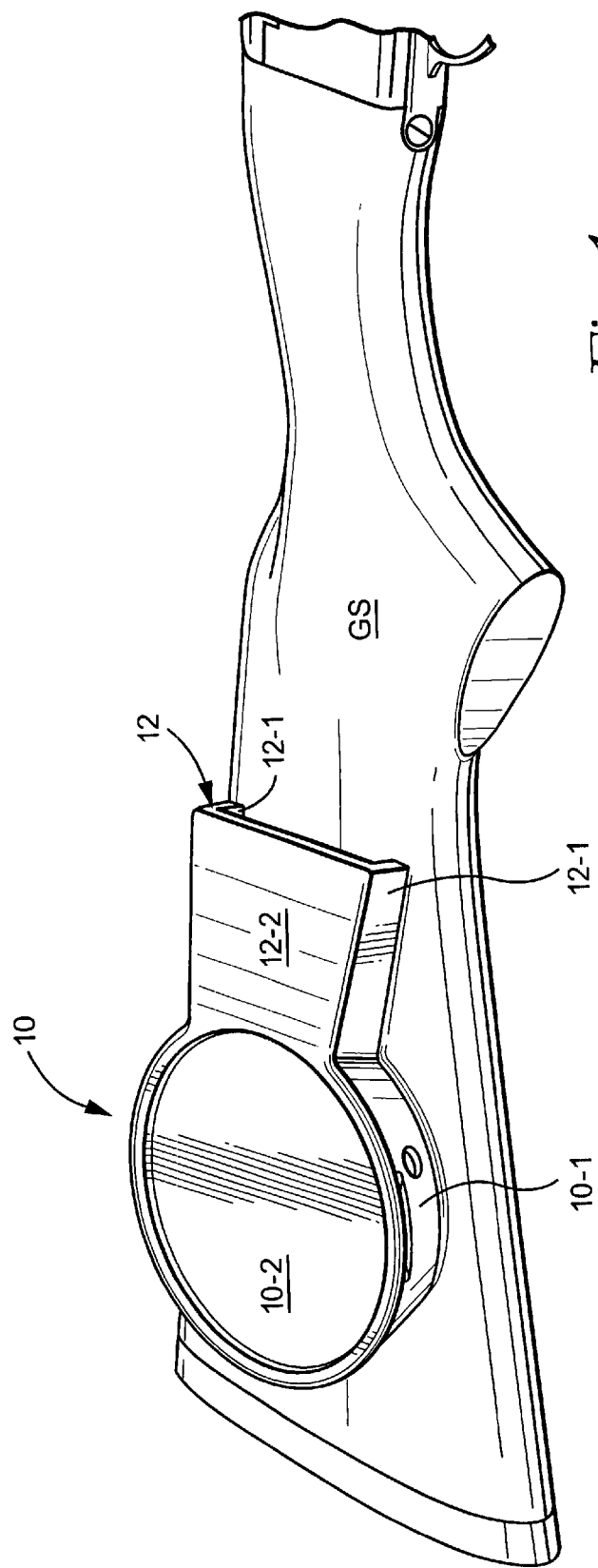
Figure 4:
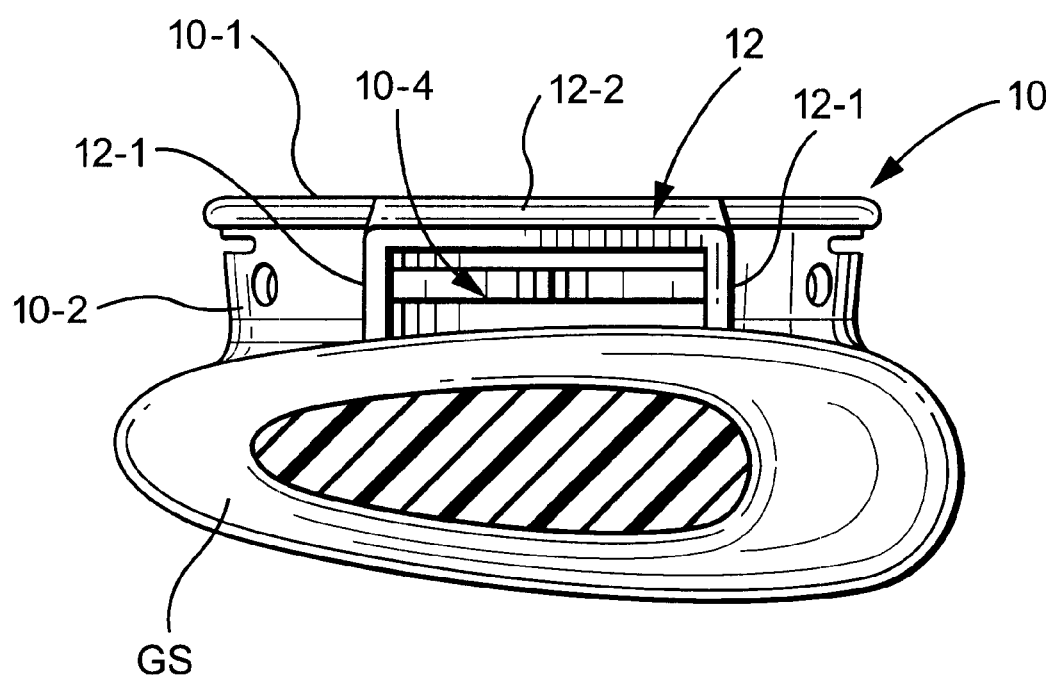
FIG. 4 is a cross-sectional elevational view of the gunstock of this invention as taken along line 4—4 in FIG. 2.
Figure 5:
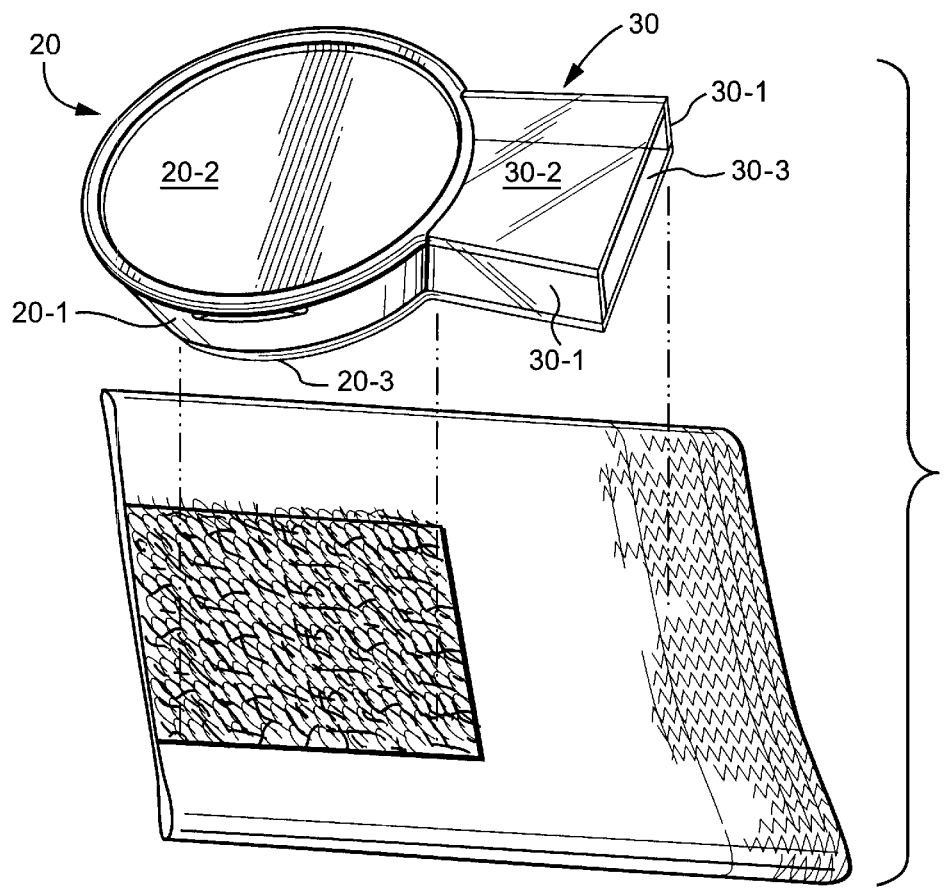
FIG. 5 is a perspective view of another embodiment of the game call device of the present invention.
Figure 6:
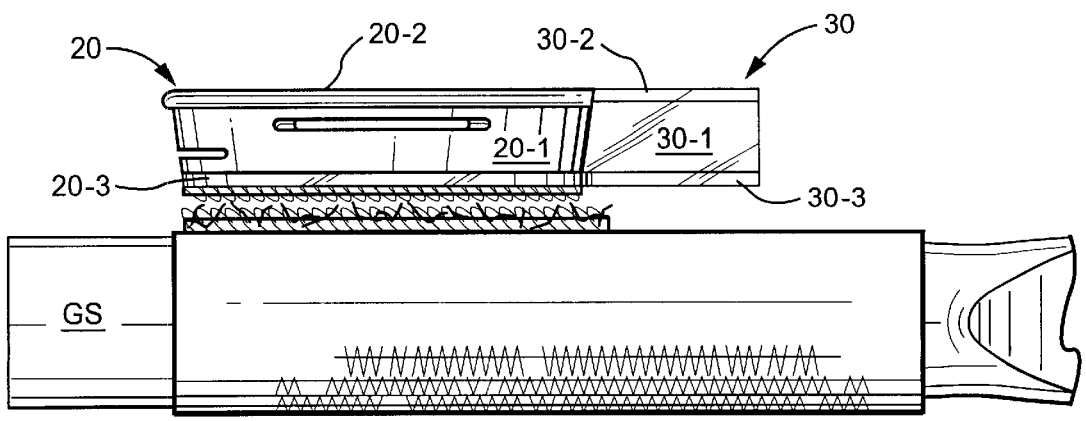
FIG. 6 is a bottom view depicting the game call device shown in FIG. 5 positioned on a gunstock.

Another embodiment of a game call device 20 in accordance with the present invention is shown in FIGS. 5 and 6. In this regard, the game call device 20 is similar to the game call device 10 discussed above, but is provided as a separate structural element (i.e., instead of being formed as an integral or unitary part of the gun stock GS). Thus, the came call device 20 is most preferably a turkey call which has a truncated conical sidewall section 20-1 and an upper circular strike face 20-2. A bottom wall 20-3 is parallel to, and positioned opposite of the strike face 20-2.

A generally triangularly shaped sound channel or a sound propagation horn 30 extends radially outwardly from the sidewall section 20-1 of the turkey call 20. The horn 20 is defined by opposed sidewalls 30-1 which diverge outwardly from one another in a direction away from the turkey call 20. A pair of opposed parallel upper and lower walls 30-2 and 30-3 join the sidewalls 30-1 one to another.

A flexible elastic support band 40 is provided which is sized and configured to be stretch-fit over the gunstock GS. The support band 40 includes an attachment region 40-1 which is most preferably one part of a two-part hook and loop fabric fastener. The other part of the two-part fastener is attached to the bottom wall 20-3 of the turkey call 20. Thus, when the support band 40 is positioned in stretch-fit surrounding relationship to the gunstock GS, the came call device 20 with its integral sound propagation horn 30 may be releasably attached thereto as is depicted in FIG. 6.

The present invention allows a hunter to more readily activate the game call device while maintaining a satisfactory hold on his/her firearm. Thus, with the present invention, the hunter does not necessarily need to set the firearm down while activating the game call device, but instead may keep the firearm in a convenient ready position in case the called game appears suddenly.

While reference has been made to a turkey call, it will be understood that such a reference is to a particularly preferred embodiment of the present invention and is non-limiting with respect thereto. Thus, other game call devices may be employed in the practice of this invention.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turkey call device which includes a generally circular strike face, a sidewall region depending from said strike face, and a tubular sound propagation horn extending outwardly from said sidewall region along a radius of said strike face.

2. A turkey call device comprising:

a strike face;

a sidewall region which surrounds said strike face so as to establish an interior of the game call device, a sound aperture defined in said sidewall region; and a tubular sound propagation horn extending radially outwardly from said sidewall region and acoustically coupled to the interior of the game call device through said sound aperture of said sidewall region, wherein the sound propagation horn includes a pair of opposed sidewalls which diverge outwardly from one another in a direction away from the game call device.

3. The turkey call device of claim 1 or 2, wherein said sound propagation horn is generally triangularly shaped.

4. The turkey call device of claim 2, wherein the sound propagation horn includes a top wall which joins said opposed sidewalls.

5. The turkey call device of claim 4, wherein the sound propagation horn further includes a bottom wall opposite said top wall.

6. A turkey call device comprising;
  (i) a sidewall region having an axis and defining a sound aperture,
  (ii) a strike face through which said axis passes; and
  (iii) a tubular sound propagation horn extending radially outwardly of said sidewall region from said sound aperture, wherein
  (iv) said sound propagation horn is generally triangularly shaped.

7. The turkey call device as in claim 1, 2 or 6, wherein the sidewall region is a truncated conically shape structure.

8. A turkey call device comprising;
  (i) a sidewall region having an axis and defining a sound aperture,
  (ii) a strike face through which said axis passes; and
  (iii) a tubular sound propagation horn extending radially outwardly of said sidewall region from said sound aperture, wherein
  (iv) said sidewall region is a truncated conically shape structure.

* * * * *